United States Patent [19]
Yamamoto et al.

[11] Patent Number: 6,028,826
[45] Date of Patent: Feb. 22, 2000

[54] OPTICAL DISK APPARATUS PERFORMING CORRECTION OF PHASE DIFFERENCE TRACKING ERROR SIGNAL, ADJUSTMENT OF FOCUS POSITION AND PROCESS OF GAIN ADJUSTMENT

[75] Inventors: Takeharu Yamamoto, Takatsuki; Katsuya Watanabe, Suita; Mitsuro Moriya, Ikoma; Takashi Kishimoto, Moriguchi, all of Japan

[73] Assignee: Matsushita Electric Industrial Co., Ltd., Kadoma, Japan

[21] Appl. No.: 08/932,192

[22] Filed: Sep. 17, 1997

[30] Foreign Application Priority Data

Sep. 18, 1996 [JP] Japan .................................. 8-245852

[51] Int. Cl.$^7$ ...................................................... G11B 7/09
[52] U.S. Cl. .................................... 369/44.35; 369/44.29; 369/44.32
[58] Field of Search .......................... 369/44.29, 44.35, 369/44.32, 44.25, 44.36, 54

[56] References Cited

U.S. PATENT DOCUMENTS

| | | | |
|---|---|---|---|
| 5,610,886 | 3/1997 | Hayashi et al. | 369/44.32 |
| 5,663,942 | 9/1997 | Ishibashi et al. | 369/44.36 |
| 5,751,674 | 5/1998 | Bradshaw et al. | 369/44.29 |
| 5,751,675 | 5/1998 | Tsutsui et al. | 369/44.27 |
| 5,761,164 | 6/1998 | Abe et al. | 369/44.32 |

*Primary Examiner*—Thang V. Tran
*Attorney, Agent, or Firm*—Renner, Otto, Boisselle & Sklar

[57] ABSTRACT

An optical disk apparatus includes a rotating device for rotating a recording medium at a prescribed reproduction rate. A converging device converges a light beam on the recording medium. A moving device moves the converging device so as to cause the converged light beam to cross a track of the recording medium. A light detection device has four areas for receiving light reflected by the recording medium and respectively outputting first, second, third and fourth detection signals. A phase correction device outputs first and second correction signals respectively by correcting the phase of the first and second detection signals in accordance with a correction amount. A tracking error detection device detects a positional offset between the converged light beam and the track based on a phase difference between first and second addition signals and outputs a tracking error signal indicating the positional offset. The first addition signal is obtained by adding the first correction signal and the fourth detection signal. The second addition signal is obtained by adding the second correction signal and the third detection signal. A tracking control device performs feedback control of the moving device so that the light beam converged on the recording medium is positioned on the track, based on the tracking error signal. An adjustment device adjusts the correction amount for the phase correction device based on an asymmetry level based on the tracking error signal without causing the tracking control device to perform feedback control.

22 Claims, 12 Drawing Sheets

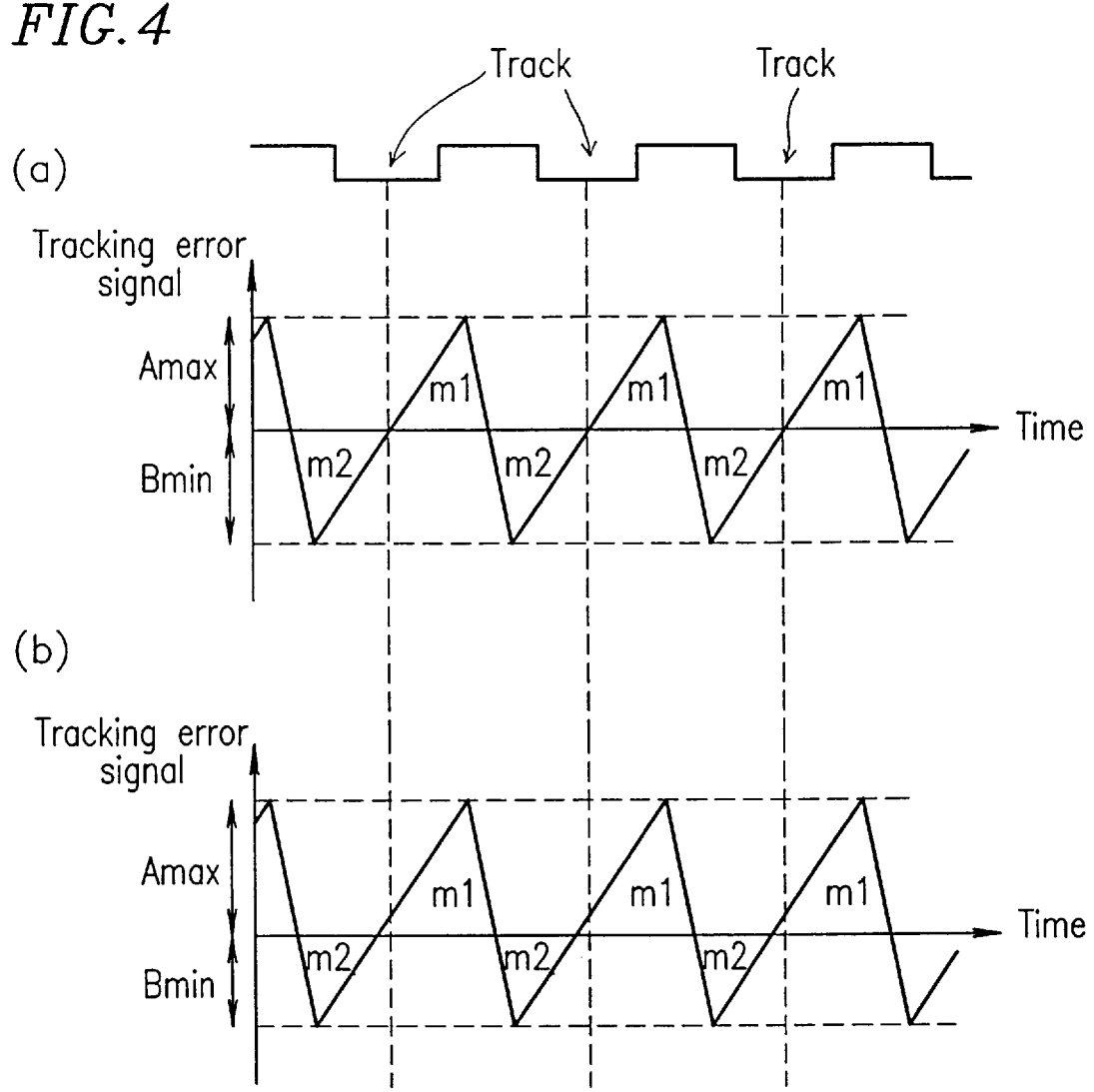

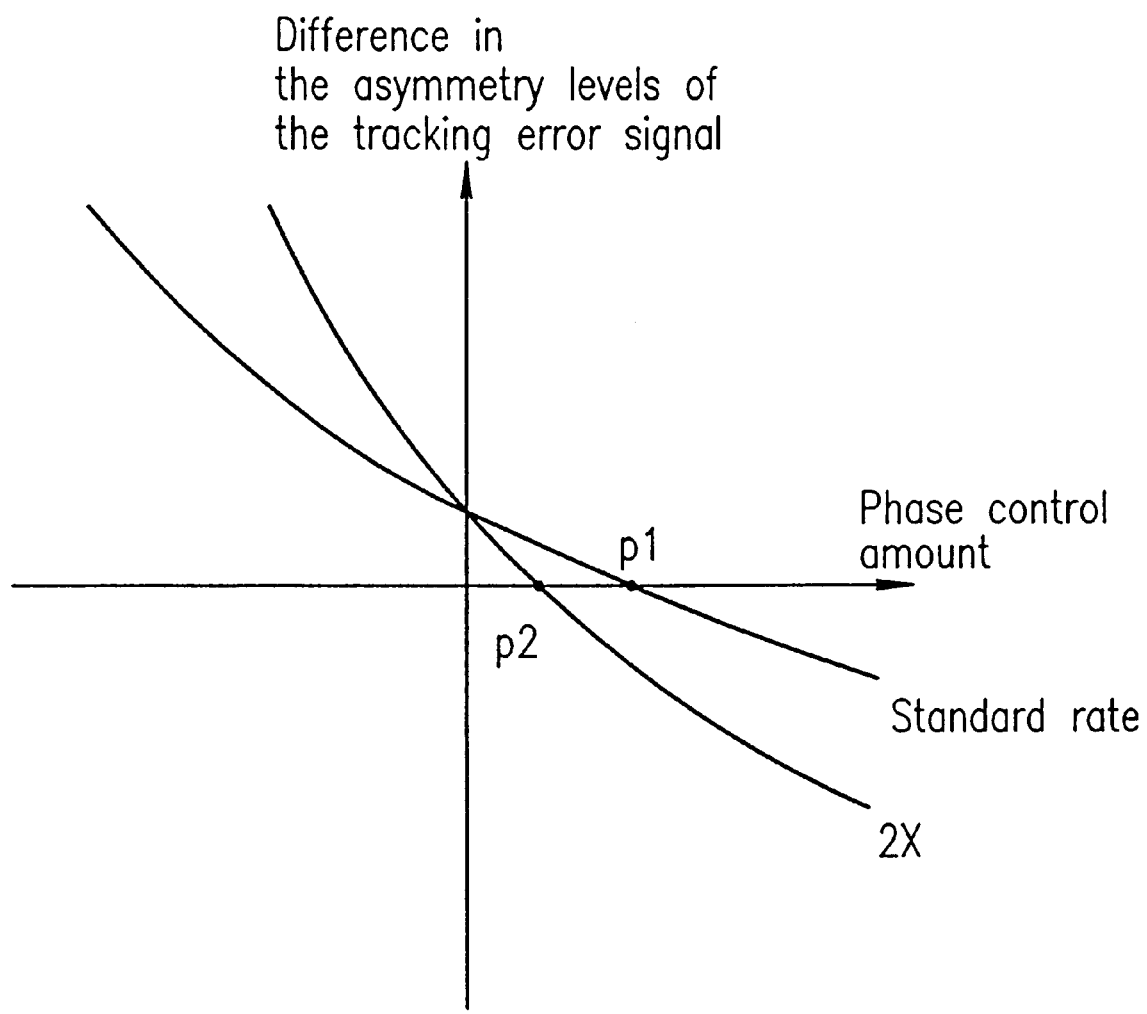

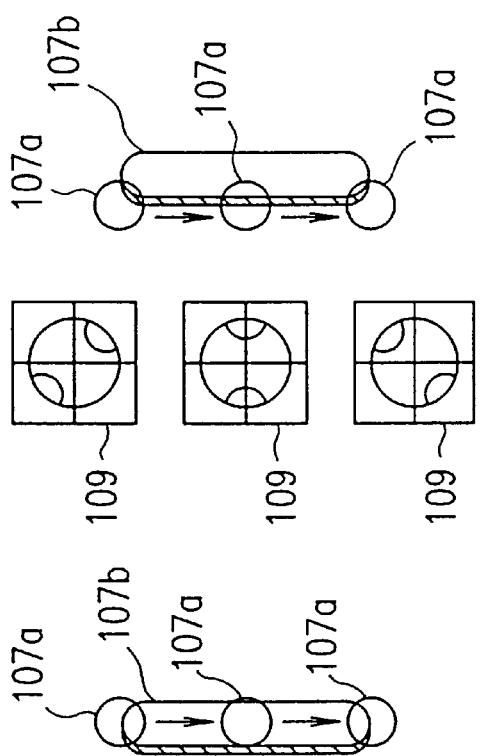
FIG. 11A PRIOR ART
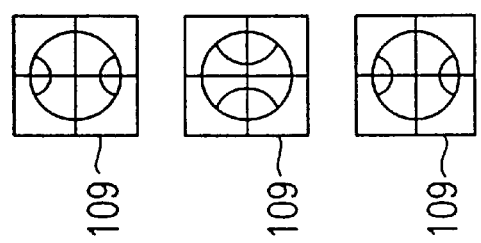
FIG. 11B PRIOR ART
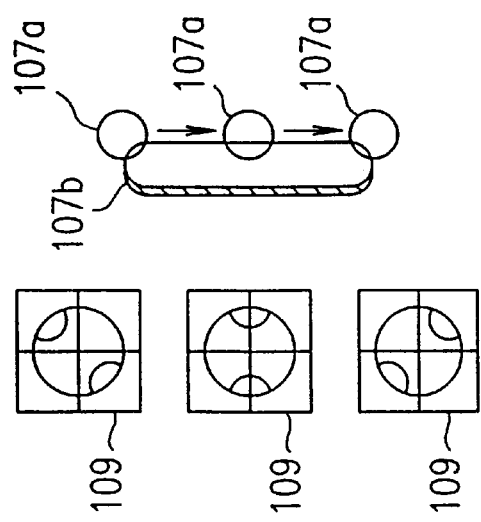
FIG. 11C PRIOR ART
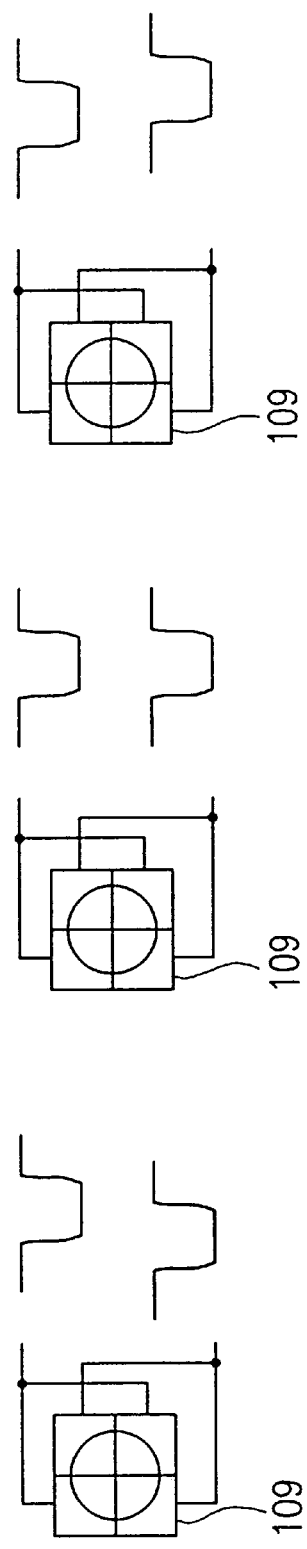

OPTICAL DISK APPARATUS PERFORMING CORRECTION OF PHASE DIFFERENCE TRACKING ERROR SIGNAL, ADJUSTMENT OF FOCUS POSITION AND PROCESS OF GAIN ADJUSTMENT

BACKGROUND OF THE INVENTION

1. Field of the Invention

The present invention relates to an optical disk apparatus for reproducing a signal recorded in an optical disk optically using a light source such as a laser, and in particular to an optical disk apparatus for adjusting the balance based on tracking error signal by a tracking error detection system using a phase difference method, adjusting a control target position in focusing control, and adjusting a gain in the focusing control and tracking control.

2. Description of the Related Art

Optical disk apparatuses (hereinafter, referred to also as "optical reproduction apparatuses") for reproducing a signal from a medium having video information, computer data or the like recorded therein have recently been demanded to have a higher speed in data reading and a higher level of reliability.

With reference to FIGS. 10 through 12, a conventional optical reproduction system will be described.

FIG. 10 is a diagram illustrating a structure of a conventional optical disk apparatus. A light beam emitted by a light source 101 such as a semiconductor laser is collimated by a collimator lens 102, reflected by a polarization beam splitter 103, passed through a ¼-wave plate 104, converged by a converging lens 105, and radiated toward an optical disk 107 which is rotated by a motor 111. The light reflected by the optical disk (reflected light) is passed through the converging lens 105, the ¼-wave plate 104, the polarization beam splitter 103 and a collection lens 108, and then radiated toward a light detector 109 divided into four light receiving areas.

The converging lens 105 is attached to a movable section of an actuator 106. When an electric current flows through a focusing coil of the actuator 106, the converging lens 105 moves in a direction perpendicular to the surface of the optical disk 107; and when an electric current flows through a tracking coil of the actuator 106, the converging lens 105 moves in a radial direction of the optical disk 107. Hereinafter, the area where the converging lens 105 is movable is referred to as the "lens moving area".

The actuator 106, the ¼-wave plate 104, the polarization beam splitter 103, the collimator lens 102, the light source 101, the collection lens 108, and the light detector 109 divided into four light receiving areas 109 are included in a head unit 110.

Outputs from four light receiving areas 109a, 109b, 109c and 109d are respectively passed through amplifiers 113a, 113b, 113c and 113d and then input to a focusing error circuit 114. The focusing error circuit 114 outputs a focusing error signal which indicates the positional offset between the focal point of the optical beam and an information recording face of the optical disk 107, based on the signals from the amplifiers 113a, 113b, 113c and 113d. The focusing error signal is processed by an adder 115, a variable amplifier 117, a phase correction device 118 for correcting a phase difference, and a driving circuit 119 for amplifying the power, and then applied to the focusing coil of the actuator 106. The head unit 110 is controlled so that the converging point of the light beam is positioned on the information recording face of the optical disk 107.

The outputs from the four light receiving areas 109a, 109b, 109c and 109d are input to a phase difference tracking error circuit 120 respectively via the amplifiers 113a, 113b, 113c and 113d. The phase difference tracking error circuit 120 outputs a tracking error signal which indicates the positional offset between the focal point of the optical beam and a track of the optical disk 107, based on the phase difference information from the amplifiers 113a, 113b, 113c and 113d, the phase difference information being obtained when the light beam passes through the pit in the track of the optical disk 107. The phase difference tracking error circuit 120 adjusts the balance based on the tracking error signal based on the signal from a controller 150.

FIGS. 11A through 11C show the principle by which the phase difference tracking error signal is detected. When a beam spot 107a passes above a pit 107b which are included in a track of the optical disk 107, the intensity pattern of the reflected light of the beam spot 107a changes over time. Specifically, as shown in FIG. 11B, when the beam spot 107a passes through the center of the pit 107b, i.e., the center of the track, the intensity pattern of the reflected light of the beam spot 107a changes symmetrically with respect to the center of the track.

As shown in FIG. 11C, when the beam spot 107a passes left with respect to the center of the pit 107b, the intensity pattern of the reflected light of the beam spot 107a changes so that the positions of the more intense part of the reflected light moves counterclockwise. As shown in FIG. 11A, when the beam spot 107a passes right with respect to the center of the pit 107b, the intensity pattern of the reflected light of the beam spot 107a changes so that the positions of the more intense part of the reflected light moves clockwise. As the beam spot 107a becomes further from the center of the pit 107b, the contrast of the intensity pattern of the reflected light of the beam spot 107a becomes clearer.

A method for detecting a tracking error signal utilizing such a change in the intensity pattern of the reflected light of the beam spot 107a is referred to as the "phase difference method". In other words, according to the phase difference method, the phases of the two signals obtained from two light receiving areas of the four light receiving areas of the light detector 109 which are located diagonally opposite to each other are compared, and the positional offset between the beam spot and the track is detected based on the advance or delay in the phase.

FIG. 12 shows an internal configuration of the phase difference tracking error circuit 120. The phase difference tracking error circuit 120 outputs a tracking error signal based on the outputs from the light receiving areas 109a and 109b and the outputs from the light receiving areas 109c and 109d. The set of light receiving areas 109a and 109b is bordered from the set of light receiving areas 109c and 109d by a border running perpendicular to a direction 109e in which the pit 107b proceeds, i.e., the tangent direction of the track.

The outputs from one of the above-mentioned two sets of light receiving areas, e.g., the outputs from the light receiving areas 109a and 109b are respectively input to phase correction sections 120a and 120b via the amplifiers 113a and 113b and delayed or advanced by the phase correction sections 120a and 120b.

Adders 120c and 120d each add the output signals from the light receiving areas of the light detector 109 diagonally opposite to each other. Specifically, the adder 120c adds the output signal from the light receiving area 109a which has been corrected by the phase correction section 120a and the output signal from the light receiving area 109c without being corrected. The adder 120d adds the output signal from the light receiving area 109b which has been corrected by the phase correction section 120b and the output signal from the light receiving area 109d without being corrected. A comparator 120e outputs a tracking error signal which indicates the positional offset between the focal point of the light beam and the track, based on the phase difference between the output from the adder 120c and the output from the adder 120d.

With reference to FIG. 10 again, the tracking error signal is applied to the tracking coil of the actuator 106 via an adder 122, a variable amplifier 124, a phase correction device 125 for correcting a phase difference, a switch 126 for turning on or off the tracking control based on the output from the controller 150, and a driving circuit 127 for amplifying the power. Thus, feedback control of the converging lens 105 is performed so that the focal point of the light beam is positioned on the track.

A driving circuit 135 is provided for controlling the motor 111 based on the output from the controller 150. The controller 150 controls the motor 111 so that the rotation rate of the motor 111 is a prescribed rate.

The gain in the focusing control and tracking control disperses due to, for example, the dispersion in the dimensions in optical disks, the over-time change in the dimensions of the optical disk, and the dispersion in the dimensions in optical heads. As the gain decreases excessively, the control precision deteriorates. As the gain increases excessively, the control system becomes unstable and may sometimes oscillate.

When the focusing control causes an offset, the quality of a reproduction signal deteriorates and thus the reliability for reading signals declines.

In order to avoid these inconveniences, the following adjustment is performed in the conventional optical disk apparatus.

First, the gain adjustment in the focusing control system will be described.

An external disturbance generator 132 outputs an external disturbance signal in response to an instruction signal from the controller 150. The external disturbance signal is added to the focusing error signal by the adder 115 and thus added to the focusing control system. The focusing error circuit 114 outputs a signal from the focusing error system in response to the external disturbance signal. A focusing error measuring circuit 136 extracts the response signal to the external disturbance signal which is included in the output signal from the focusing error circuit 114, and outputs the signal to the controller 150. The controller 150 compares the external disturbance signal generated by the external disturbance generator 132 and the response signal to the external disturbance signal from the focusing error measuring circuit 136, and determines the amplification ratio of the variable amplifier 117 so that both signals have a prescribed relationship.

Next, the gain adjustment in the tracking control system will be described.

As in the gain adjustment in the focusing control system, an external disturbance generator 134 outputs an external disturbance signal in response to an instruction signal from the controller 150. The external disturbance signal is added to the tracking error signal by the adder 122 and thus added to the tracking control system. The tracking error circuit 120 outputs a signal from the tracking error system in response to the external disturbance signal. A tracking error measur-ing circuit 133 extracts the response signal to the external disturbance signal which is included in the output signal from the tracking error circuit 120, and outputs the signal to the controller 150. The controller 150 compares the external disturbance signal generated by the external disturbance generator 134 and the response signal to the external disturbance signal from the tracking error measuring circuit 133, and determines the amplification ratio of the variable amplifier 124 so that both signals have a prescribed relationship.

Offset adjustment in the focusing control system will be described.

The offset adjustment in the focusing control system is performed by measuring the jitter of a reproduction signal. An adder 128 outputs a signal (RF signal) to a jitter amount detection circuit 129. The signal (RF signal) sent to the jitter amount detection circuit 129 is the sum of the signals from the light receiving areas 109a, 109b, 109c and 109d of the light detector 109 which have been processed by the amplifiers 113a, 113b, 113c and 113d. The jitter amount detection circuit 129 measures the jitter amount of the RF signal. The controller 150 outputs an offset signal to the adder 115 so as to minimize the jitter amount measured by the jitter amount detection circuit 129.

The conventional optical disk apparatus described above has the following problems.

When the converging lens 105 moves in a radial direction of the optical disk 107 (lens shift), an offset occurs in the tracking error signal detected by the phase difference method. The offset amount varies in accordance with the de-focusing state or the depth of the pit in the optical disk 107. When the tracking control is operated in the state where the offset occurs in the tracking error signal by the lens shift, if the decentering of the optical disk 107 is excessively large, a large offset occurs in the tracking error signal. Thus, the tracking offset increases, which deteriorates the tracking control precision. Since the tracking control thus becomes unstable, the reliability of the optical disk apparatus declines.

When the focusing position is offset excessively, the quality of the RF signal deteriorates. Accordingly, the jitter amount cannot be measured by the jitter amount detection circuit 129. As a result, it becomes difficult to adjust the focusing position of the converging lens 105 at a prescribed target position.

When the optical disk apparatus receives a vibration or a scratch exists on the optical disk 107 during the adjustment of the focusing position of the converging lens 105, the amplitude of the reproduction signal or the jitter amount fluctuates. Accordingly, the adjustment precision of the focusing position of the converging lens 105 declines. When a further vibration or an external disturbance caused by a scratch on the optical disk 107 is added when the target position of the focusing position is changed, the focal point of the light beam converged by the converging lens 105 cannot be within a prescribed area (in this specification, such a phenomenon is referred to as "focusing skip").

When the optical disk apparatus receives a vibration or a scratch exists on the optical disk 107 during the gain adjustment of the focusing control system or the tracking control system, a further vibration or an external disturbance caused by the scratch on the optical disk 107 is added to the external disturbance which is already added to the control system in order to adjust the gain. Accordingly, focusing skip or tracking skip occurs (in this specification, "tracking skip" refers to that the light beam converged by the converging lens 105 is not positioned on a target track of the optical disk 107.)

In the case of an optical disk apparatus for reproducing a compact disk at a plurality of rates of standard, 2×, and 6×, various adjustments such as gain adjustment are performed at the start of the optical disk apparatus at the respective reproduction rate. Accordingly, the start-up time of the optical disk apparatus at the respective rate is extended.

SUMMARY OF THE INVENTION

According to one aspect of the invention, an optical disk apparatus includes a rotating device for rotating a recording medium at a prescribed reproduction rate; a converging device for converging a light beam on the recording medium; a moving device for moving the converging device so as to cause the light beam converged on the recording medium to cross a track of the recording medium; a light detection device having a first area, a second area, a third area and a fourth area for receiving reflected light reflected by the recording medium and respectively outputting a first detection signal, a second detection signal, a third detection signal and a fourth detection signal corresponding to the reflected light; a phase correction device for outputting a first correction signal by correcting a phase of the first detection signal in accordance with a correction amount and also outputting a second correction signal by correcting a phase of the second detection signal in accordance with the correction amount; a tracking error detection device for detecting a positional offset between the light beam converged on the recording medium and the track based on a phase difference between a first addition signal and a second addition signal and outputting a tracking error signal indicating the positional offset, the first addition signal being obtained by adding the first correction signal output from the phase correction device and the fourth detection signal output from the light detection device and the second addition signal being obtained by adding the second correction signal output from the phase correction device and the third detection signal output from the light detection device; a tracking control device for performing feedback control of the moving device so that the light beam converged on the recording medium is positioned on the track, based on the tracking error signal; and an adjustment device for adjusting the correction amount for the phase correction device based on an asymmetry level based on the tracking error signal without causing the tracking control device to perform feedback control.

According to another aspect of the invention, an optical disk apparatus includes a rotating device for rotating a recording medium at a prescribed reproduction rate; a converging device for converging a light beam on the recording medium; a moving device for moving the converging device so as to cause the light beam converged on the recording medium to cross a track of the recording medium; a light detection device having a first area, a second area, a third area and a fourth area for receiving reflected light reflected by the recording medium and respectively outputting a first detection signal, a second detection signal, a third detection signal and a fourth detection signal corresponding to the reflected light; a phase correction device for outputting a first correction signal by correcting a phase of the first detection signal in accordance with a correction amount and also outputting a second correction signal by correcting a phase of the second detection signal in accordance with the correction amount; a tracking error detection device for detecting a positional offset between the light beam converged on the recording medium and the track based on a phase difference between a first addition signal and a second addition signal and outputting a tracking error signal indicating the positional offset, the first addition signal being obtained by adding the first correction signal output from the phase correction device and the fourth detection signal output from the light detection device and the second addition signal being obtained by adding the second correction signal output from the phase correction device and the third detection signal output from the light detection device; a tracking control device for performing feedback control of the moving device so that the light beam converged on the recording medium is positioned on the track, based on the tracking error signal; and an adjustment device for adjusting the correction amount for the phase correction device based on an asymmetry level based on the tracking error signal without causing the tracking control device to perform feedback control. When the reproduction rate is changed from a first reproduction rate to a second reproduction rate, the adjustment device determines a second correction amount for the phase correction device based on a first reproduction amount for the phase correction device for the first reproduction rate.

According to still another aspect of the invention, an optical disk apparatus includes a converging device for converging a light beam on a recording medium; a moving device for moving the converging device so that a converging point of the light beam converged by the converging device moves in a direction substantially perpendicular to an information recording face of the recording medium; a light detection device for receiving reflected light reflected by the recording medium and outputting a detection signal corresponding to the reflected light; a converging state detection device for detecting a converging state of the light beam radiated toward the information recording face of the recording medium based on the detection signal output from the light detection device, and outputting a converging state detection signal indicating the converging state; a focusing control device for controlling the moving device so that a focusing position of the converging device is at a target position, based on the converging state detection signal; a reproduction signal amplitude detection device for detecting a reproduction signal from the signal output from the light detection device and detecting an amplitude of the reproduction signal; a jitter amount detection device for detecting a signal corresponding to a jitter of the reproduction signal; and a focusing position adjustment device for adjusting the focusing position of the converging device based on the output from the reproduction signal amplitude detection device, and then adjusting the focusing position of the converging device based on the output from the jitter amount detection device.

According to still another aspect of the invention, an optical disk apparatus includes a converging device for converging a light beam on a recording medium; a moving device for moving the converging device so that a converging point of the light beam converged by the converging device moves in a prescribed direction; a light detection device for receiving reflected light reflected by the recording medium and outputting a detection signal corresponding to the reflected light; a control device for controlling the moving device so that the error signal has a prescribed value based on the error signal output from the error detection device; a gain adjustment device for applying an external disturbance to a control loop of the control device and adjusting a loop gain of the control device based on the error signal output from the error detection device in response to the application of the external disturbance of the control loop; and an abnormality detection device for detecting at least one of a vibration of the optical disk apparatus and a scratch on the recording medium. The gain adjustment device stops the application of the external disturbance for adjusting the loop gain of the control device in response to the detection of at least one of the vibration of the optical disk apparatus or the scratch on the recording medium and to fulfillment of a prescribed condition.

According to still another aspect of the invention, an optical disk apparatus includes a converging device for converging a light beam on a recording medium; a moving device for moving the converging device so as to cause the light beam converged by the converging device to cross a track of the recording medium; a light detection device for receiving reflected light reflected by the recording medium and outputting a detection signal corresponding to the reflected light; a converging state detection device for detecting a converging state of the light beam radiated toward an information recording face of the recording medium based on the detection signal output from the light detection device and outputting a converging state detection signal indicating the converging state; a focusing control device for controlling the moving device so that a focusing position of the converging device is at a target position, based on the converging state detection signal; an adjustment device for adjusting the focusing position of the converging device based on the detection signal output from the light detection device; and an abnormality detection device for detecting at least one of a vibration of the optical disk apparatus and a scratch on the recording medium. The adjustment device stops the adjustment of the focusing position of the converging device performed by the focusing control device in response to the detection of at least one of the vibration of the optical disk apparatus or the scratch on the recording medium.

According to still another aspect of the invention, an optical disk apparatus includes a rotating device for rotating a recording medium at a prescribed reproduction rate; a converging device for converging a light beam on the recording medium; a moving device for moving the converging device so as to cause the light beam converged by the converging device to cross a track of the recording medium; a light detection device for receiving reflected light reflected by the recording medium and outputting a detection signal corresponding to the reflected light; a converging state detection device for detecting a converging state of the light beam radiated toward an information recording face of the recording medium based on the detection signal output from the light detection device, and outputting a converging state detection signal indicating the converging state; a focusing control device for controlling the moving device so that a focusing position of the converging device is at a target position, based on the converging state detection signal; and a gain adjustment device for applying an external disturbance to a control loop of the focusing control device, and adjusting a loop gain of the focusing control device based on the converging state detection signal output from the converging state detection device in response to the application of the external disturbance to the control loop. When the reproduction rate is changed from a first reproduction rate to a second reproduction rate, the gain adjustment device determines a loop gain for the focusing control device for the second reproduction rate based on a loop gain for the focusing control device adjusted for the first reproduction rate.

According to still another aspect of the invention, an optical disk apparatus includes a rotating device for rotating a recording medium at a prescribed reproduction rate; a converging device for converging a light beam on the recording medium; a moving device for moving the converging device so as to cause the light beam converged by the converging device to cross a track of the recording medium; a light detection device for receiving reflected light reflected by the recording medium and outputting a detection signal corresponding to the reflected light; a tracking offset detection device for detecting a positional offset between the light beam converged on the recording medium and the track of the recording medium based on the detection signal from the light detection device, and outputting a tracking error signal indicating the positional offset; a tracking control device for performing feedback control of the moving device so that the light beam converged on the recording medium is positioned on the track, based on the tracking error signal; and a gain adjustment device for applying an external disturbance to a control loop of the tracking control device, and adjusting a loop gain of the tracking control device based on the tracking error signal output from the tracking offset detection device in response to the application of the external disturbance to the control loop. When the reproduction rate is changed from a first reproduction rate to a second reproduction rate, the gain adjustment device determines a loop gain for the tracking control device for the second reproduction rate based on a loop gain for the tracking control device adjusted for the first reproduction rate.

In accordance with one aspect of the invention, the optical disk apparatus moves a converging device for converging a light beam by a moving device which moves in a direction crossing a track of a recording medium, and adjusts a phase correction amount for a phase correction device based on an asymmetry level based on a tracking error signal without causing a tracking control device to perform feedback control.

In accordance with another aspect of the invention, the optical disk apparatus determines a second correction amount for the phase correction device for a second reproduction rate, based on a first correction amount for the phase correction device adjusted for a first reproduction rate.

In accordance with still another aspect of the invention, the optical disk apparatus adjusts a focusing position of the converging device based on an output from a reproduction signal amplitude detection device, and then adjusts a focusing position of the converging device based on an output from a jitter amount detection device, using a focusing position adjusting device.

In accordance with still another aspect of the invention, when a vibration of the optical disk apparatus or a scratch on an optical disk is detected by an abnormality detection device, the optical disk apparatus stops the application of an external disturbance for adjusting a gain of a control loop of a focusing control device, using a gain adjustment device.

In accordance with still another aspect of the invention, when a vibration of the optical disk apparatus or a scratch on an optical disk is detected by the abnormality detection device, the optical disk apparatus stops the application of an external disturbance for adjusting a gain of a control loop of a tracking control device, using the gain adjustment device.

In accordance with still another aspect of the invention, when a vibration of the optical disk apparatus or a scratch on an optical disk is detected by the abnormality detection device, the optical disk apparatus stops the adjustment of the position of the converging device, using an adjustment device.

In accordance with still another aspect of the invention, the optical disk apparatus determines a loop gain for the focusing control for the second reproduction rate, based on a loop gain for the focusing control adjusted for the first reproduction rate, using the gain adjustment device for adjusting the loop gain of the focusing control device.

In accordance with still another aspect of the invention, the optical disk apparatus determines a loop gain for the tracking control for the second reproduction rate, based on a loop gain for the tracking control adjusted for the first reproduction rate, using the gain adjustment device for adjusting the loop gain of the tracking control device.

Thus, the invention described herein makes possible the advantages of:

(1) providing an optical disk apparatus for reproducing data stored in an optical disk by highly precise and stable tracking control by accurately correcting an offset in a tracking error signal caused by the lens shift even when the decentering of the optical disk is excessively large by the dispersion in the dimensions in optical disks, the over-time change in the dimensions in the optical disk, and the dispersion in the dimensions in optical heads.

(2) providing an optical disk apparatus for shortening the start-up time when the reproduction is performed at one of a plurality of rates by quickly correcting an offset in the tracking error signal caused by the lens shift and thus shortening the adjustment time;

(3) providing an optical disk apparatus for adjusting the focusing position of a converging device to a prescribed target position so as to minimize the jitter amount with certainty even when the focusing position is excessively offset;

(4) providing an optical disk apparatus for adjusting the gain in the focusing control system with high precision and stability without causing focusing skip even when a vibration of the optical disk apparatus or a scratch on the optical disk exists;

(5) providing an optical disk apparatus for adjusting the gain in the tracking control system with high precision and stability without causing tracking skip even when a vibration of the optical disk apparatus or a scratch on the optical disk exists;

(6) providing an optical disk apparatus for adjusting the focusing position of the converging device to a prescribed target position with high precision even when a vibration or a scratch on the optical disk exists;

(7) providing an optical disk apparatus for shortening the start-up time when the reproduction is performed at one of a plurality of rates by shortening the adjustment time of the loop gain in the focusing control system; and (8) providing an optical disk apparatus for shortening the star t-up time when the reproduction is performed at one of a plurality of rates by shortening the adjustment time of the loop gain in the tracking control system.

These a nd other advantages of the present invention will become apparent to those skilled in the art upon reading and understanding the following detailed description with reference to the accompanying figures.

BRIEF DESCRIPTION OF THE DRAWINGS

FIG. 4 is a diagram illustrating a tracking error signal according to the present invention;

FIG. 5 is a graph illustrating the difference in the asymmetry levels based on the tracking error signal for different reproduction rates in accordance with the phase control amount according to the present invention;

FIG. 11A, 11B and 11C are views illustrating the principle for detecting a phase difference tracking signal.

DESCRIPTION OF THE PREFERRED EMBODIMENTS

Hereinafter, the present invention will be described by way of illustrative examples with reference to the accompanying drawings.

Figure 1:
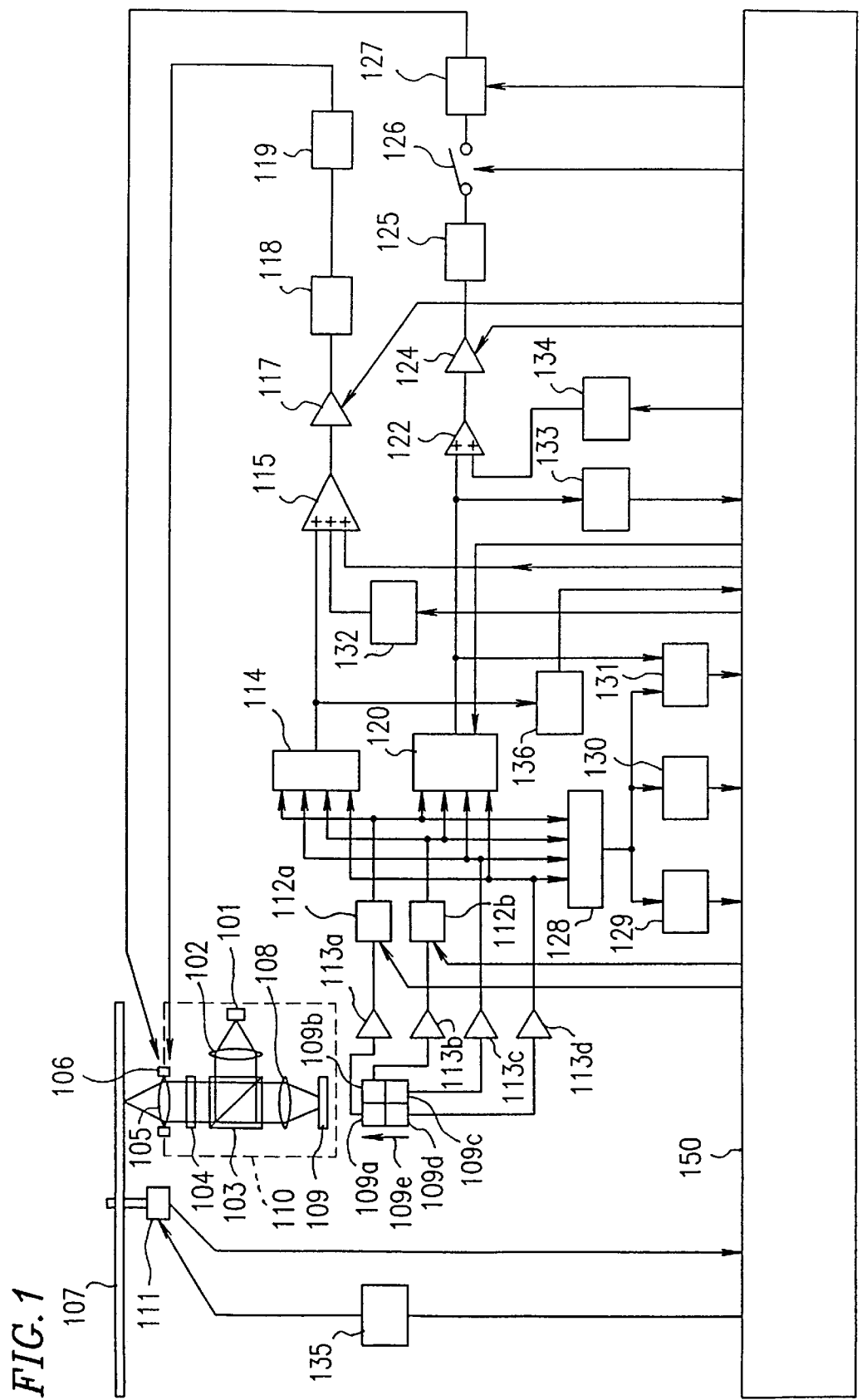
FIG. 1 is a diagram illustrating a structure of an optical disk apparatus according to the present invention.
Figure 10:
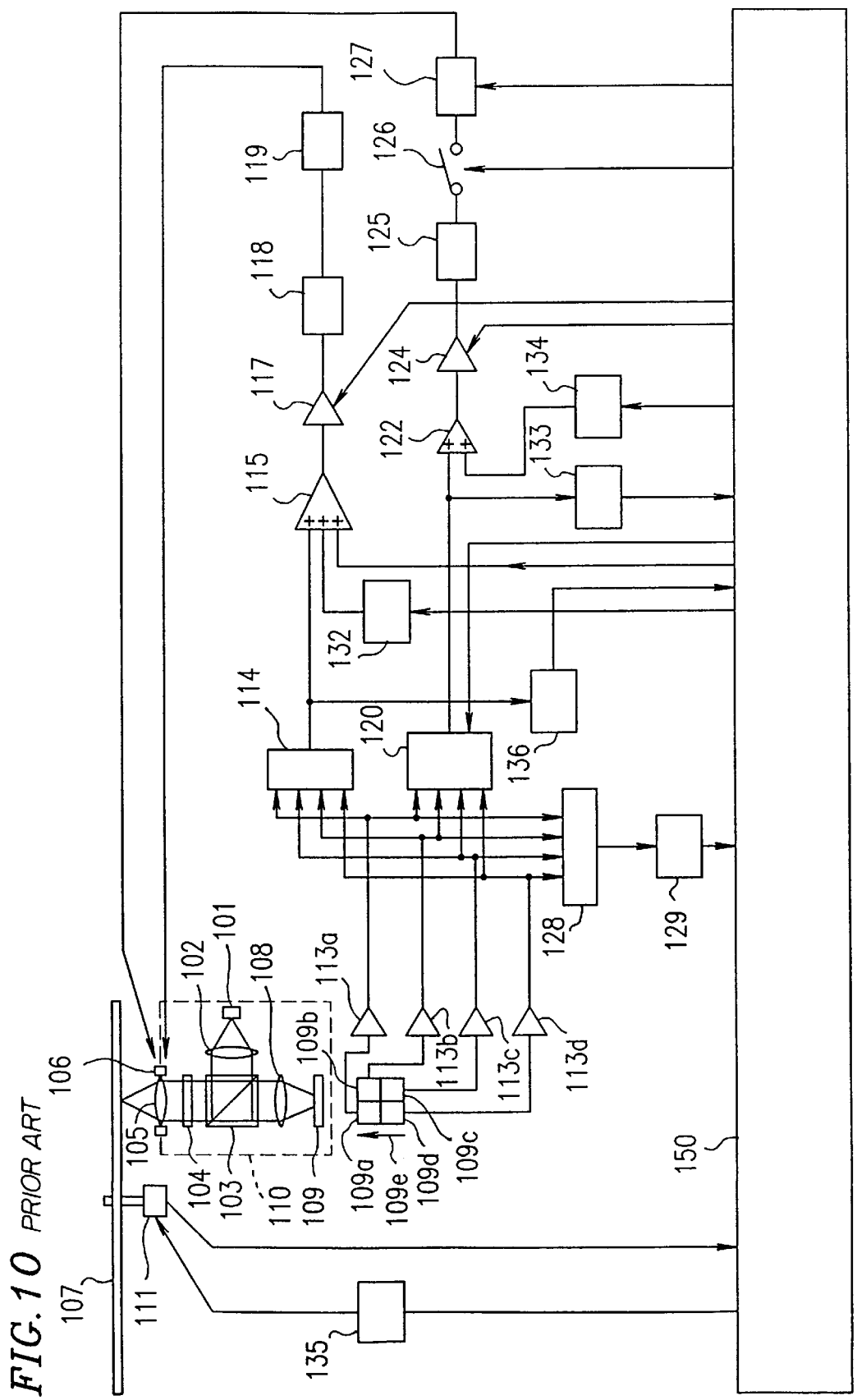
FIG. 10 is a diagram illustrating a structure of a conventional optical disk apparatus.
Figure 12:
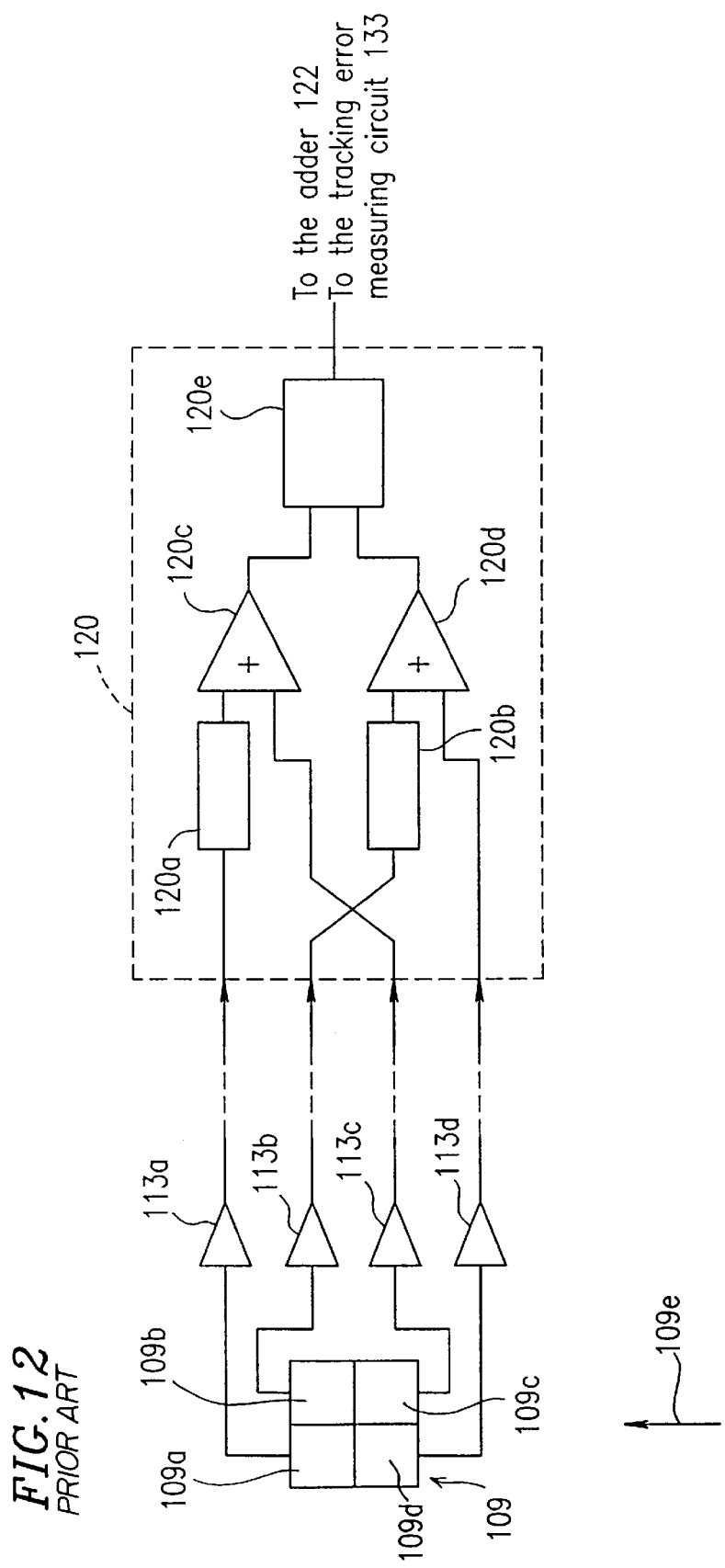
FIG. 12 is a view illustrating an internal configuration of a phase difference tracking circuit.

With reference to FIGS. 1, 2A, 2B, 3A, 3B, 4 and 5, correction of an offset caused by the lens shift will be described. FIG. 1 is a diagram illustrating a structure of an optical disk apparatus in an example according to the present invent-on. Identical elements previously discussed with respect to FIG. 10 will bear identical reference numerals therewith and the descriptions thereof will be omitted.

The motor 111 rotates the optical disk 107. The converging lens 105 is controlled so that the converging point of the light beam is positioned on the information recording face of the optical disk 107. In this state, the controller 150 turns off the switch 126. When the switch 126 is turned off, tracking control is not performed. The controller 150 sends a signal to the driving circuit 127 to drive the converging lens 105 in the direction crossing the track of the optical disk 107, thereby moving a first lens position x1 shown in FIGS. 2A and 2B.

The controller 150 sends a signal to phase control circuits 112a and 112b (FIG. 1) to set the phase control amount (i.e., correction amount) at a first value. The controller 150 reads the maximum value (Amax) and the minimum value (Amin) with respect to the reference level of the tracking error signal from the tracking error measuring circuit 133. The controller 150 finds, from Amax and Amin, a first asymmetry level which is obtained based on the tracking error signal with respect to the reference position in the lens moving area when the converging lens 105 is at the first lens position x1.

The asymmetry level based on the tracking error signal with respect to the reference position in the lens moving area is obtained by the following expression.

$$\text{Asymmetry level} = (|A_{max}| - |A_{min}|)/(|A_{max}| + |A_{min}|)$$

where $|A_{max}|$ represents the absolute value of Amax, and $|A_{min}|$ represents the absolute value of Amin. $(|A_{max}| - |A_{min}|)$ is referred to as the "offset in the tracking error signal" and $(|A_{max}| + |A_{min}|)$ is referred to as the "amplitude of the tracking error signal".

The controller 150 then sets the phase control amount at a second value. The controller 150 finds a second asymmetry level based on the tracking error signal with respect to the reference position in the lens moving area when the converging lens 105 is at the first lens position ×1, from the outputs from tracking error measuring circuit 133.

The controller 150 repeats the operation until the n'th phase control amount is obtained. In this specification, the first through n'th phase control amounts are referred to as the "phase control amount candidates". The controller 150 sends a signal to the driving circuit 127 to drive the converging lens 105 in the direction crossing the track of the optical disk 107, thereby moving the converging lens 105 to a second lens position ×2 (FIG. 2) which is opposite to the first lens position ×1 with respect to the reference position in the lens moving area.

The controller 150 sends a signal to the phase control circuits 112a and 112b (FIG. 1) to set the phase control amount at the first value. The controller 150 obtains the first asymmetry level based on the tracking error signal with respect to the reference position in the lens moving area when the converging lens 105 is at the second lens position ×2, from the outputs from the tracking error measuring circuit 133. Then, after setting the phase control amount at the second value, the controller 150 obtains the second asymmetry level based on the tracking error signal with respect to the reference position in the lens moving area when the converging lens 105 is at the second lens position ×2, from the outputs from the tracking error measuring circuit 133.

The controller 150 repeats the operation until the n'th phase control amount is obtained. The controller 150 obtains a sum of the absolute values of the asymmetry levels based on the tracking error signal with respect to the reference position in the lens moving area when the converging lens 105 is at the first and second lens positions ×1 and ×2 for each phase control amount. The controller 150 sets the phase control amount of the phase control circuits 112a and 112b so as to minimize the sum of the absolute values of the asymmetry levels based on the tracking error signal with respect to the reference position in the lens moving area.

Figure 2A:
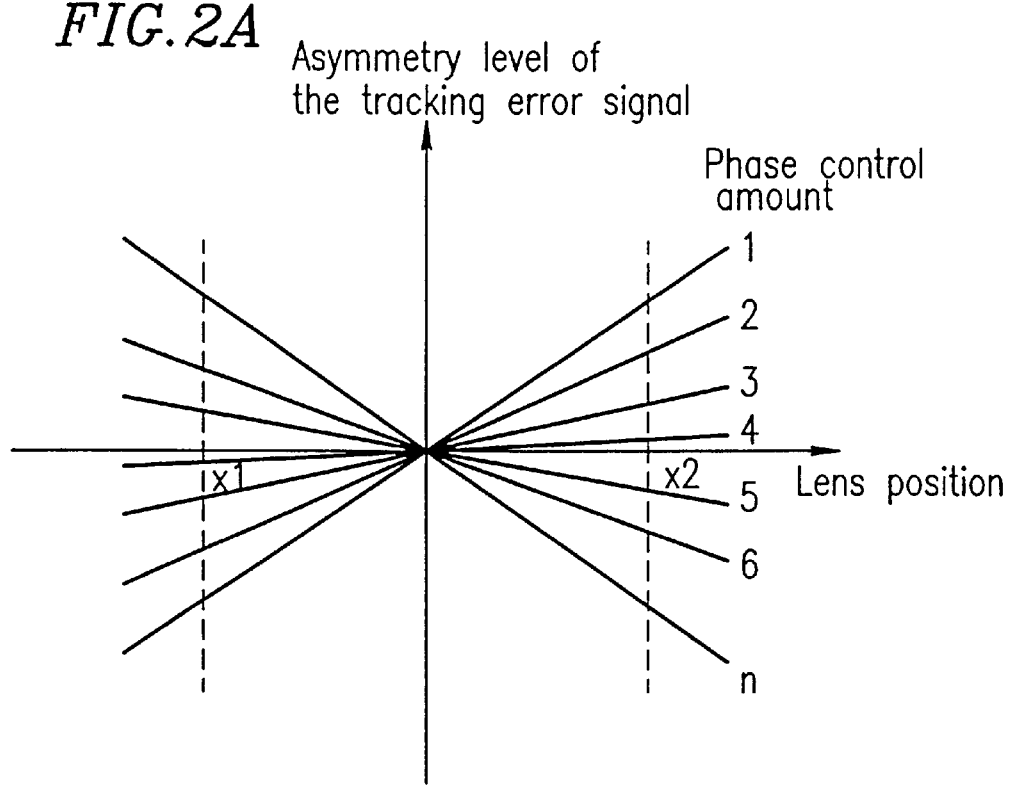
FIGS. 2A and 2B are graphs illustrating the determination of a phase control amount based on an asymmetry level obtained based on a tracking error signal according to the present invention.
Figure 2B:
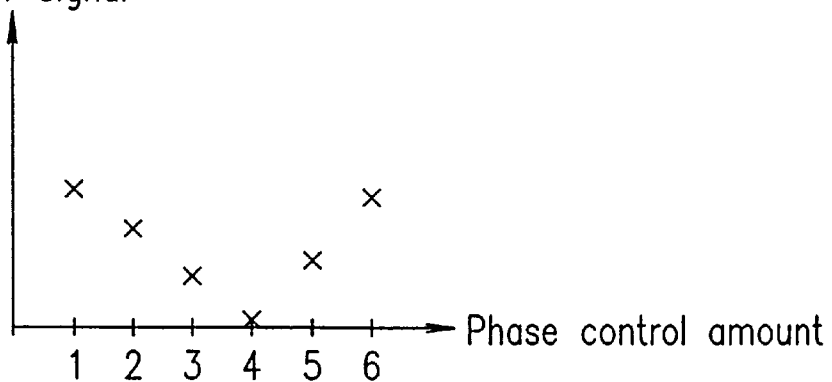

FIGS. 2A and 2B are graphs illustrating how the phase control amount is determined based on the asymmetry levels based on the tracking error signal according to the present invention. FIG. 2A shows the asymmetry level based on the tracking signal using the phase control amount as the parameter. The horizontal axis represents the position of the converging lens, and the vertical axis represents the asymmetry level based on the tracking error signal. In FIG. 2B, the horizontal axis represents the phase control amount, and the vertical axis represents the sum of the absolute values of the asymmetry levels based on the tracking error signal with respect to the reference position in the lens moving area when the converging lens 105 is at the first and second lens positions ×1 and ×2 for each phase control amount. The controller 150 sets the phase control amount to the fourth phase control value, i.e., the value at which the sum of the absolute values of the asymmetry levels based on the tracking error signal with respect to the reference position in the lens moving area is minimized.

By setting the phase control amount as described above, even when the lens shift occurs, the change of the asymmetry levels based on the tracking error signal caused by change in the lens position can be restricted to be minimum. Accordingly, the resultant optical disk apparatus can correct the offset in the tracking error signal even when an optical disk having an excessively large decentering due to the dispersion in the dimensions of optical disks, the over-time change in the dimensions of the optical disk, and the dispersion in the dimensions of optical heads is mounted and thus an excessively large lens shift occurs. Such an optical disk apparatus can reproduce data stored in the optical disk having an excessively large decentering by highly precise and stable tracking control.

In this example, the phase control amount is determined based on the asymmetry levels based on the tracking error signal with respect to the reference position in the lens moving area when the converging lens 105 is at the first position and the second position. In the case where, as shown in FIGS. 2A and 2B, an offset exists in the tracking error signal, the same effect can be achieved by determining the phase control amount so as to minimize the asymmetry level based on the tracking error signal with respect to the reference position in the lens moving area, based only on the asymmetry level based on the tracking error signal with respect to the reference position in the lens moving area when the converging lens 105 is at the first position without measuring the asymmetry level regarding the second lens position.

Figure 3A:
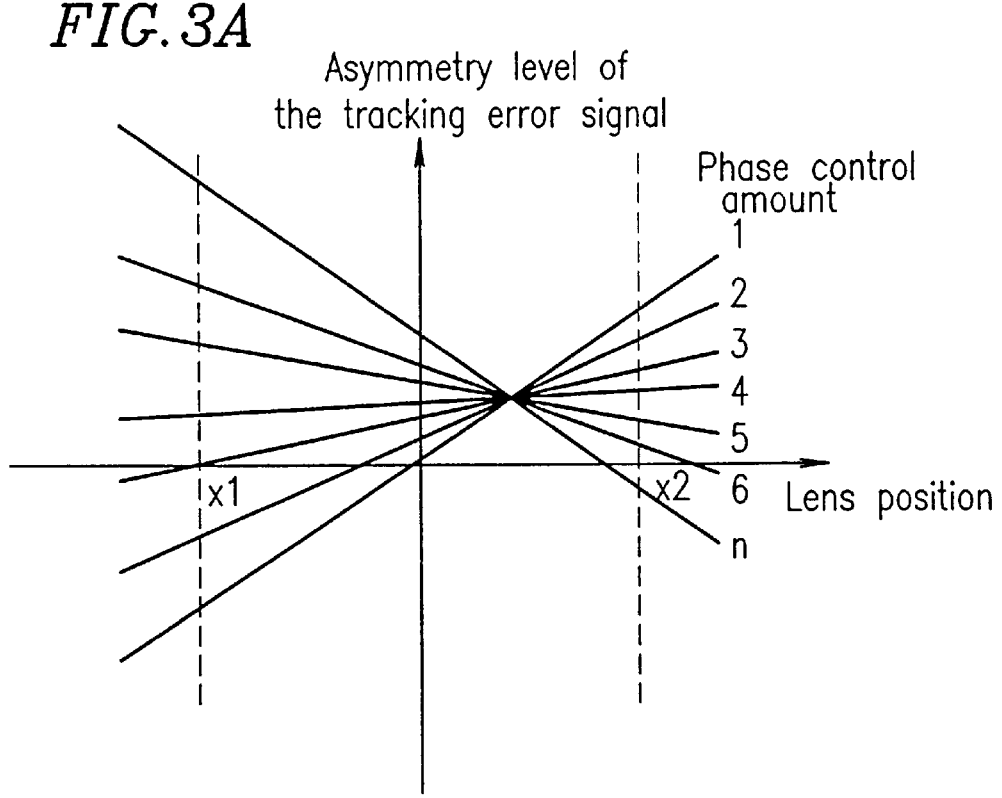
FIGS. 3A and 3B are graphs illustrating the determination of a phase control amount based on an asymmetry level based on a tracking error signal according to the present invention.
Figure 3B:
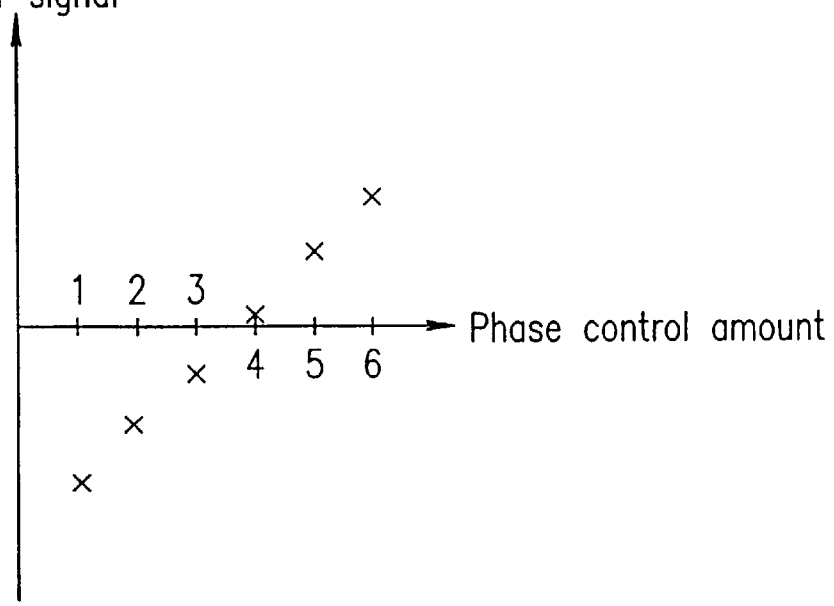

FIGS. 3A and 3B are also graphs illustrating how the phase control amount is determined based on the asymmetry levels based on the tracking error signal according to the present invention. In the case where the pit in the optical disk has a certain shape or optical heads are dispersed in the dimensions thereof, an offset does not exist in the tracking error signal as shown in FIGS. 2A and 2B but does exits as shown in FIGS. 3A and 3B.

FIG. 3A is a graph showing the asymmetry level based on the tracking signal using the phase control amount as the parameter as FIG. 2A. The horizontal axis represents the position of the converging lens, and the vertical axis represents the asymmetry level based on the tracking error signal. In FIG. 3B, the horizontal axis represents the phase control amount, and the vertical axis represents the sum of the absolute values of the asymmetry levels based on the tracking error signal with respect to the reference position in the lens moving area when the converging lens 105 is at the first and second lens positions ×1 and ×2 for each phase control amount.

In the method described with reference to FIGS. 2A and 2B, the controller 150 determines the phase control amount so as to minimize the sum of the absolute values of the asymmetry levels based on the tracking error signal with respect to the reference position in the lens moving area when the converging lens 105 is at the first position and the second position. In the case shown in FIGS. 3A and 3B where an offset occurs in the tracking error signal in the state where the lens is at the reference position in the lens moving area, the controller 150 cannot determine an optimum phase control amount by the above-described manner of minimizing the sum of the absolute values of the asymmetry levels based on the tracking error signal.

In the case shown in FIG. 3A, the phase control amount at which the change in the asymmetry level based on the tracking error signal with respect to the reference position in the lens moving area between when the lens is the first lens position x1 and when the lens is at the second lens position x2 is minimum is the fourth phase control amount. However, when the phase control amount is determined so as to minimize the sum of the absolute values of the asymmetry levels based on the tracking error signal with respect to the reference position in the lens moving area when the converging lens 105 is at the first position and the second position, the third phase control amount is selected.

In order to avoid the selection of such an inappropriate phase control amount, the phase control amount is determined so as to minimize the difference in the asymmetry levels based on the tracking error signal with respect to the reference position in the lens moving area between when the lens is at the first lens position x1 and when the lens is at the second lens position x2 as shown in FIG. 3B. In this manner, the change in the absolute values of the asymmetry levels based on the tracking error signal caused by the change in the lens position can be restricted to be minimum. Such a manner of determining the phase control amount so as to minimize the difference in the asymmetry levels based on the tracking error signal between the two lens positions is applicable to the case shown in FIGS. 2A and 2B where an offset does not exist in the tracking error signal.

FIG. 4 is a graph illustrating a tracking error signal according to the present invention. As shown in parts (a) and (b) of FIG. 4, the controller 150 can obtain the asymmetry level based on the tracking error signal with respect to the reference position in the lens moving area based on a positive integration value m1 obtained by conducting integration of a positive value and a negative integration value m2 obtained by conducting integration of a negative value.

By slightly vibrating the converging lens 105 to such an extent that several light beams transverse the track of the optical disk when the tracking error signal is measured, the controller 150 can detect the minimum and maximum values or positive and negative integration values with certainty whether the optical disk is decentered or not.

When a phase control amount is a certain value, the asymmetry level based on the tracking error signal with respect to the reference position in the lens moving area at the time of the lens shift may be substantially zero, which makes the amplitude of the tracking error signal excessively small. In such a case, the controller 150 measures the amplitude of the tracking error signal simultaneously with the asymmetry level based on the tracking error signal with respect to the reference position in the lens moving area. By determining the phase control amount among the phase control amounts corresponding to the amplitude of the tracking error signal of a certain level of more, the same effect as above can be achieved.

A compact disk reproduction apparatus, for example, reproduces information at a plurality of reproduction rates such as standard, 2x, and 8x. In such a case also, the compact disk reproduction apparatus can determine the phase control amount by conducting the above-described measurement at each of the plurality of rates. In this manner, the same effect as above can be achieved at the respective reproduction rate.

Next, how the phase control amount for the tracking error signal at the time of lens shift is determined in an optical disk operable at a plurality of reproduction rates according to the present invention will be described.

With reference to FIG. 1, the controller 150 sends a signal to the driving circuit 135 to control the motor 111 to reproduce at a first reproduction rate. As in the case of correcting the offset of the tracking error signal described above, the controller 150 determines the phase control amount for the phase control circuits 112a and 112b. In the case where a second reproduction rate needs to be used by an external signal or the like, the controller 150 sends a signal to the driving circuit 135 to control the motor 111 to operate at the second reproduction rate.

The controller 150 sets the phase control amount for the second reproduction rate based on the phase control amount determined for the first reproduction rate.

FIG. 5 is a graph showing the difference in asymmetry levels based on the tracking error signal with respect to the reference position in the lens moving area in accordance with the phase control amount for each of a plurality of reproduction rates according to the present invention. As shown in FIG. 5, the phase control amount is set to p1 at the standard reproduction rate and to p2 at the 2x reproduction rate. In this manner, the difference in asymmetry levels based on the tracking error signal with respect to the reference position in the lens moving area can be restricted to be minimum at each reproduction rate even when the lens shift occurs. As shown in FIG. 5, the phase control amount p2 for the 2x reproduction rate is ½ of the phase control amount p1 for the standard reproduction rate. In other words, the phase control amount corresponding to the minimum difference in asymmetry levels based on the tracking error signal is substantially in inverse proportion to the reproduction rate. For the reproduction at the second reproduction rate, the controller 150 sets, as the phase control amount for the phase control circuits 112a and 112b, a value obtained by multiplying the phase control amount for the first reproduction rate with a value which is obtained by dividing the first reproduction rate by the second reproduction rate.

In other words, the determination of a phase control amount is conducted only with a prescribed reproduction rate (for example, standard rate), and the determination of the phase control amount for another reproduction rate is conducted based on the phase control amount for the prescribed reproduction rate. Accordingly, the adjustment of the phase control amount need not be performed for each reproduction rate. Due to such a system, the adjustment time can be shortened compared to the case where the phase control amount is adjusted for each reproduction rate. As a result, the start-up time of the optical disk apparatus can be shortened.

Next, an optical disk apparatus for adjusting the focusing position of the converging lens 105 so as to minimize the jitter amount with certainty even when the focusing position is excessively offset will be described.

With reference to FIG. 1, the controller 150 turns on the switch 126 to perform tracking control. The controller 150 applies an offset to the adder 115 so as to maximize the amplitude of the RF signal based on the output from an amplitude measuring circuit 130, thereby adjusting the focusing offset. Next, the controller 150 applies an offset to the adder 115 so as to minimize the jitter amount based on the output from the jitter measuring circuit 129, thereby fine-adjusting the focusing offset.

Figure 6:
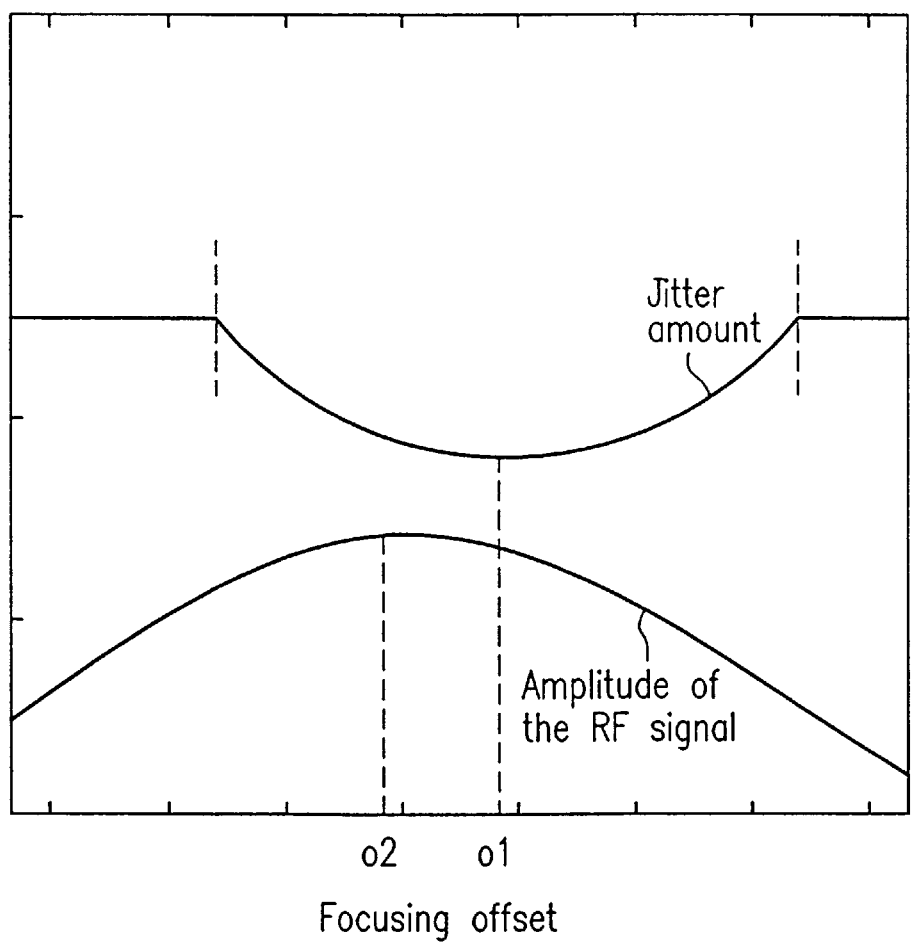
FIG. 6 is a graph illustrating the jitter amount and amplitude of an RF signal in accordance with the focusing offset according to the present invention.

FIG. 6 shows the jitter amount and amplitude of the RF signal in accordance with the focusing error signal according to the present invention. The horizontal axis represents the offset applied to the focusing error signal, and the vertical axis represents the jitter amount and amplitude of the RF signal. As shown in FIG. 6, as the focusing offset increases in a positive or negative direction, the S/N ratio of the RF signal is reduced. As the focusing offset increases in a positive or negative direction, the jitter saturates and thus the jitter amount cannot be obtained. Thus, the jitter amount of the RF signal cannot be detected.

Accordingly, when the initial defocusing is excessively large, the jitter amount cannot be detected, which prevents adjustment of the focusing position based on the jitter amount. The amplitude of the RF signal is obtained in correspondence with the focusing offset in a wide range of focusing offsets. Accordingly, even if the initial defocusing is excessively large, the focusing position can be adjusted based on the amplitude of the RF signal. However, the offset at which the amplitude of the RF signal is maximum and the offset at which the amplitude of the RF signal is minimum do not match each other. Accordingly, the optimum focusing position cannot be obtained by the adjustment based only on the amplitude of the RF signal.

In order to overcome this inconvenience, the controller 150 first adjusts the focusing offset so as to maximize the amplitude of the RF signal based on the output from the amplitude measuring circuit 130, and then adjusts the focusing offset so as to minimize the jitter amount based on the output from the jitter amount measuring circuit 129. The controller 150 adds the focusing offset determined in this manner to the adder 115. Accordingly, even if the initial defocusing is excessively large, the focusing position of the converging lens 105 can be adjusted so as to minimize the jitter amount with certainty. As a result, the focusing position of the converging lens 105 can be adjusted with high precision.

Next, an optical disk apparatus for adjusting the loop gain with high precision even in the case where a vibration or a scratch on the optical disk 107 exists will be described, with reference to FIGS. 1 and 9A through 9C.

First, a loop gain adjustment in the focusing control system will be described.

The controller 150 sends a signal to the external disturbance generator 132 to adjust the loop gain in the focusing control system, thereby applying an external disturbance to the focusing control system. An abnormality detector 131 detects an external disturbance, which is not generated by the external disturbance generator 132, such as a scratch on the optical disk 107 or a vibration, based on the lack of the RF signal, the level of the tracking error signal in a prescribed band, or the like.

When the abnormality detector 131 detects an abnormality, the controller 150 sends a signal to the external disturbance generator 132 to stop the output of the external disturbance for measurement. When the abnormality detector 131 no longer detects an abnormality, the controller 150 resumes sending a signal to the external disturbance generator 132 to output the external disturbance.

Figure 9A:
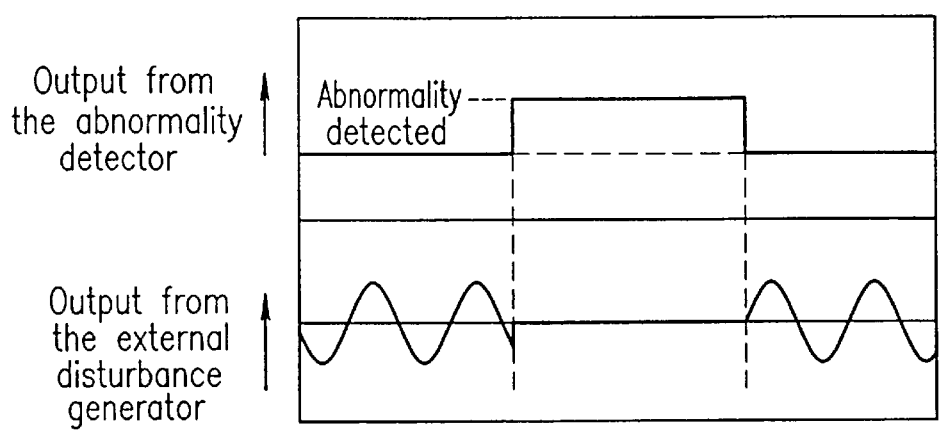
FIGS. 9A, 9B and 9C are diagrams showing the waveforms of the abnormality detector and an external disturbance generator when the output of the generation of external disturbance is temporarily stopped according to the present invention.

FIG. 9A shows a waveform of the outputs from the abnormality detector and the external disturbance generator. As shown in FIG. 9A, in the case where an external disturbance due to a scratch on the optical disk 107 or the like, which is not generated by the external disturbance generator 132, is detected during the application of the external disturbance generated by the external disturbance generator 132 for measurement, the controller 150 temporarily stops the application of the external disturbance for measurement. Accordingly, the external disturbance due to a vibration or a scratch on the optical disk 107 is not added to the external disturbance for measurement, i.e., for gain adjustment. As a result, the focusing control is not significantly disturbed, and thus the focusing skip can be prevented.

Next, a loop gain adjustment in the tracking control system will be described.

The controller 150 sends a signal to the external disturbance generator 134 to adjust the loop gain in the tracking control system, thereby applying an external disturbance to the tracking control system. When the abnormality detector 131 detects an abnormality, the controller 150 sends a signal to the external disturbance generator 134 to stop the output of the external disturbance for measurement. When the abnormality detector 131 no longer detects an abnormality, the controller 150 resumes sending a signal to the external disturbance generator 132 to output the external disturbance.

In this manner, in the case where an external disturbance due to a scratch on the optical disk 107 or the like, which is not generated by the external disturbance generator 134, is detected during the application of the external disturbance generated by the external disturbance generator 132 for measurement, the controller 150 temporarily stops the application of the external disturbance for measurement. As a result, the tracking control is not significantly disturbed, and thus the tracking skip can be prevented.

Figure 9B:
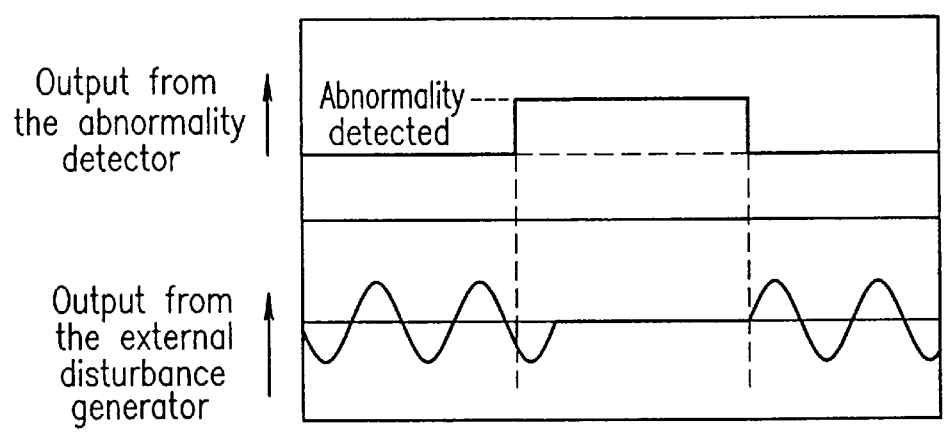

In the above example, when an abnormality is detected, the generation of the external disturbance for gain adjustment is instantaneously stopped. The same effect can be achieved by, as shown in FIG. 9B, stopping the output of the external disturbance after the output of the external disturbance output becomes zero. The reason is that, because the stepped change of the external disturbance when the output of the external disturbance is stopped can be reduced, the adverse affect of the change on the control can be further alleviated.

Figure 9C:
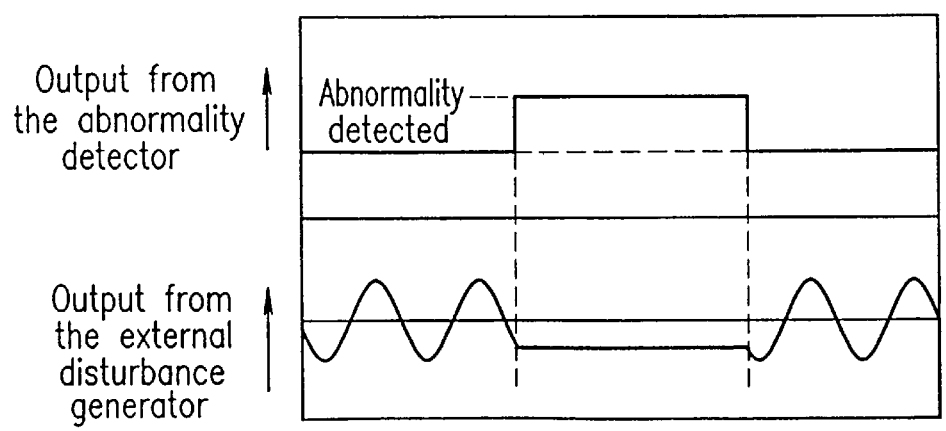

In the case where the amplitude of the external disturbance is small and the offset by the external disturbance does not influence the control, the same effect can be achieved by, as shown in FIG. 9C, stopping the operation of the external disturbance generator while maintaining the output value of the external disturbance generator at the time when the abnormality is detected.

Next, an optical disk apparatus for adjusting the focusing position of the converging lens 105 with high precision even when a vibration of the optical disk apparatus or a scratch on the optical disk 107 exists will be described.

With reference to FIG. 1, the controller 150 applies an offset to the adder 115 so as to maximum the amplitude of the RF signal based on the amplitude measuring circuit 130 for measuring the amplitude of the RF signal, thereby adjusting the focusing offset of the converging lens 105. When the abnormality detector 131 detects an abnormality such as a vibration or a scratch on the optical disk 107 during the adjustment, the controller 150 stops the adjustment.

When the abnormality detector 131 no longer detects such an abnormality, the controller 150 resumes the adjustment.

Figure 7A:
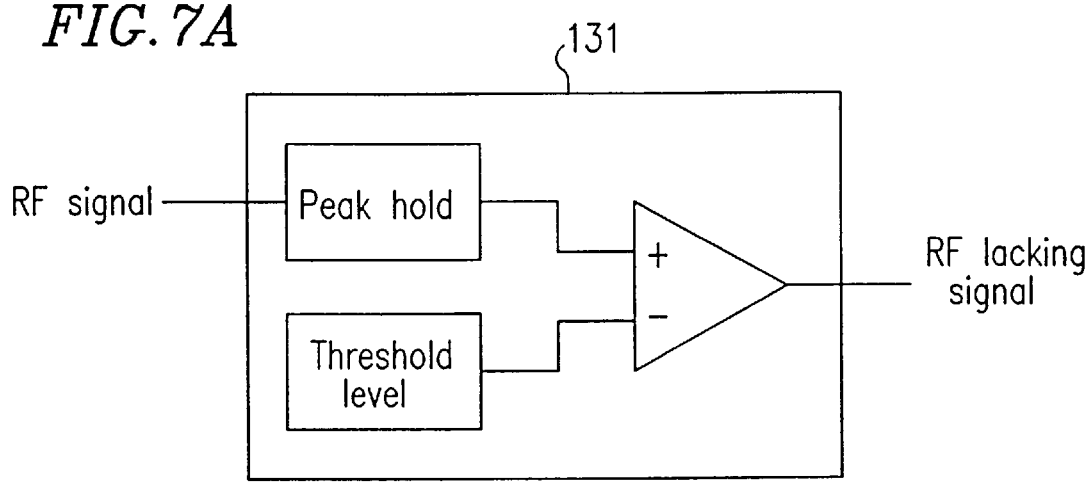
FIGS. 7A and 7B are views illustrating an abnormality detector of the optical disk apparatus according to the present invention.
Figure 7B:
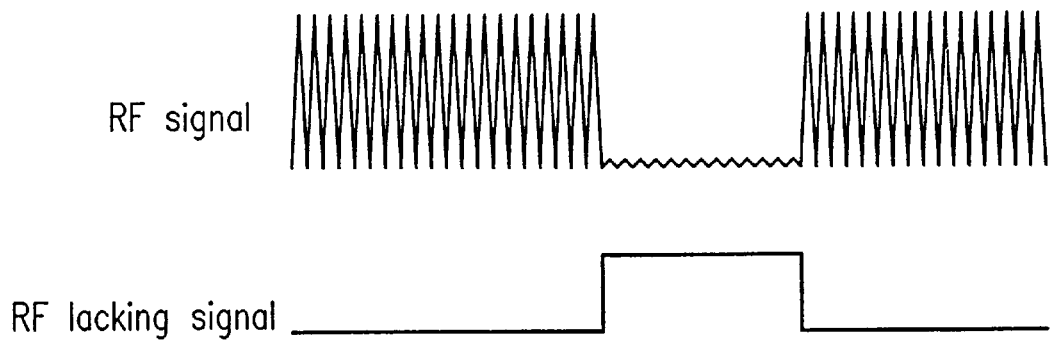

FIGS. 7A, 7B, 8A and 8B show the structure and operation of the abnormality detector 131. As shown in FIGS. 7A and 7B, the abnormality detector 131 compares the level of the signal holding the peak of the amplitude of the RF signal and the threshold level, to detect a lack of the RF signal due to the scratch on the optical disk 107 or the like.

Figure 8A:
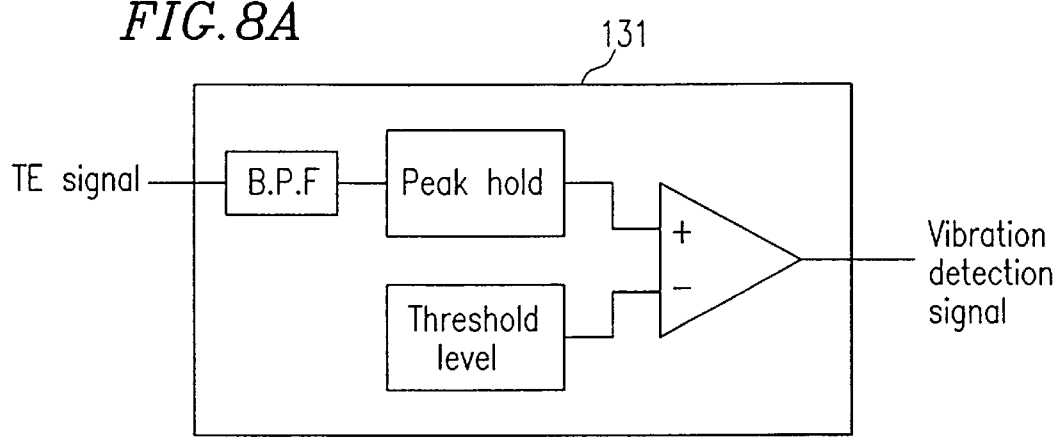
FIGS. 8A and 8B are views illustrating an abnormality detector of the optical disk apparatus according to the present invention.
Figure 8B:
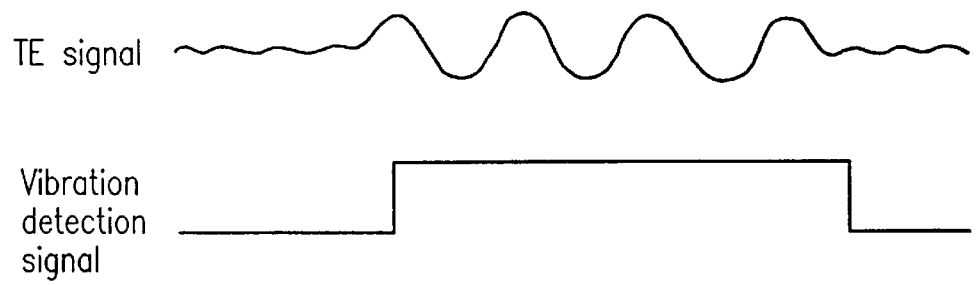

As shown in FIGS. 8A and 8B, the abnormality detector 131 compares the level of the tracking error signal in a prescribed band detected by a band-pass filter (BPF) and the threshold level, to detect a vibration added to the optical disk apparatus.

As described above, when an external disturbance caused by the scratch on the optical disk 107 or the like is detected during the adjustment of the focusing position of the converging lens 105, the controller 150 temporarily stops the adjustment of the focusing position. Accordingly, the controller 150 can adjust the focusing position of the converging lens 105 without being influenced by the change in the amplitude of the RF signal due to the vibration or the scratch on the optical disk 107 or the change in the jitter amount.

During the time period in which the external disturbance is being detected, the target focusing position of the converging lens 105 is not changed for adjustment. Accordingly, the focusing skip which is caused by the simultaneous occurring of the external disturbance and the change in the target focusing position can be prevented.

In the above example, the offset to be applied to the adder 115 is adjusted so as to maximize the amplitude of the RF signal. The same effect can be achieved by adjusting, using the controller 150, the offset to be applied to the adder 115 so as to minimize the jitter amount based on the output from the jitter amount measuring circuit 129.

Alternatively, the same effect can be achieved by adjusting, using the controller 150, the offset to be applied to the adder 115 so as to minimize the signal obtained by the adding the output from the amplitude measuring circuit 130 and the output from the jitter amount measuring circuit 129 at a prescribed ratio.

Next, an optical disk apparatus for reproducing data at a plurality of reproduction rates for shortening the start-up time by shortening the adjustment time of the loop gain will be described referring to FIG. 1.

First, the adjustment time of the loop gain in the focusing control system is shortened in the following manner.

The controller 150 sends a signal to the driving circuit 135 to control the motor 111 to operate at the first reproduction rate. The controller 150 sends a signal to the external disturbance generator 132 to apply the external disturbance to the focusing error signal. The controller 150 measures the focusing error signal by the external disturbance which is output from the external disturbance generator 132, using the focusing error measuring circuit 136. The controller 150 determines the amplification ratio of the variable amplifier 117 so that the gain in the focusing control system is a prescribed value.

In the case where the second reproduction rate needs to be used by the external signal or the like, the controller 150 sends a signal to the driving circuit 135 to control the motor 111 to operate at the second reproduction rate. The controller 150 sets, as the loop gain for the second reproduction rate, the sum of the loop gain for the first reproduction rate and the difference between the gain for the second reproduction rate and the gain for the first reproduction gain, and thus determines the amplification ratio of the variable amplifier 117.

In other words, the determination of a loop gain is conducted only with a prescribed reproduction rate, and the determination of the loop gain for another reproduction rate is conducted based on the loop gain for the prescribed reproduction rate. Accordingly, adjustment of the loop gain need not be performed for each reproduction rate. Due to such a system, the adjustment time can be shortened.

Next, the adjustment time of the loop gain in the tracking control system is shortened in the following manner with reference to FIG. 1.

The controller 150 sends a signal to the driving circuit 135 to control the motor 111 to operate at the first reproduction rate. The controller 150 sends a signal to the external disturbance generator 134 to apply the external disturbance to the tracking error signal. The controller 150 measures the tracking error signal by the external disturbance which is output from the external disturbance generator 134, using the tracking error measuring circuit 133. The controller 150 determines the amplification ratio of the variable amplifier 124 so that the gain in the tracking control system is a prescribed value.

In the case where the second reproduction rate needs to be used by the external signal or the like, the controller 150 sends a signal to the driving circuit 135 to control the motor 111 to operate at the second reproduction rate. The controller 150 sets, as the loop gain for the second reproduction rate, the sum of the loop gain for the first reproduction rate and the difference between the gain for the second reproduction rate and the gain for the first reproduction gain, and thus determines the amplification ratio of the variable amplifier 124.

In other words, as in the case of the adjustment of the loop gain in the focusing control system, the determination of a loop gain is conducted only with a prescribed reproduction rate, and the determination of the loop gain for another reproduction rate is conducted based on the loop gain for the prescribed reproduction rate. Accordingly, adjustment of the loop gain need not be performed for each reproduction rate. Due to such a system, the adjustment time can be shortened.

According to the present invention, even when the decentering of the optical disk is excessively large by the dispersion in the dimensions of optical disks, the over-time change in the dimensions of the optical disk, and the dispersion in the dimensions of optical heads, an optimum phase correction amount at the time of the lens shift can be determined. Thus, an optical disk apparatus for reproducing data stored in an optical disk by highly precise and stable tracking control can be provided.

According to the present invention, an offset in the tracking error signal is adjusted only at a prescribed reproduction rate, and the adjustment amount for the offset for another reproduction rate is determined based on the adjustment amount for the tracking error signal for the prescribed reproduction rate. Thus, the adjustment time of the phase correction amount at the time of the lens shift can be shortened. As a result, the start-up time of the optical disk apparatus operable at a plurality of reproduction rates can be shortened.

According to the present invention, the adjustment of the focusing position of the converging device is performed by first adjusting the focusing position of the converging device so as to maximize the amplitude of the RF signal and then adjusting the focusing position of the converging device so as to minimize the jitter amount. Thus, the state where the jitter amount cannot be measured to prevent the adjustment is avoided. As a result, the focusing position of the converging device can be adjusted so as to minimize the jitter amount with certainty. Moreover, the reliability of the read data is improved.

According to the present invention, when an abnormality is detected during the application of the external disturbance for the gain adjustment of the focusing control system, the application of the external disturbance is temporarily stopped. Thus, the focusing offset is avoided. As a result, the gain of the focusing control system can be adjusted with high precision and stability.

According to the present invention, when an abnormality is detected during the application of the external disturbance for the gain adjustment of the tracking control system, the application of the external disturbance is temporarily stopped. Thus, the tracking offset is avoided. As a result, the gain of the tracking control system can be adjusted with high precision and stability.

According to the present invention, when an abnormality is detected during the adjustment of the focusing position of the converging device, the adjustment of the focusing position is temporarily stopped. Thus, the adjusting precision of the focusing position of the converging device is maintained. As a result, focusing skip is avoided.

According to the present invention, the adjustment of the loop gain for the focusing control is conducted at the prescribed reproduction rate and the loop gain of the focusing control for another reproduction rate is determined based on the loop gain for the prescribed reproduction rate. Thus, the adjustment time of the loop gain for the focusing control for a plurality of reproduction rates can be shortened. As a result, the start-up time of the optical disk apparatus operable at a plurality of reproduction rates can be shortened.

According to the present invention, the adjustment of the loop gain for the tracking control is conducted at the prescribed reproduction rate and the loop gain of the tracking control for another reproduction rate is determined based on the loop gain for the prescribed reproduction rate. Thus, the adjustment time of the loop gain for the tracking control for a plurality of reproduction rates can be shortened. As a result, the start-up time of the optical disk apparatus operable at a plurality of reproduction rates can be shortened.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus, comprising:
    a rotating device for rotating a recording medium at a prescribed reproduction rate;
    a converging device for converging a light beam on the recording medium;
    a moving device for moving the converging device so as to cause the light beam converged on the recording medium to cross a track of the recording medium;
    a light detection device having a first area, a second area, a third area and a fourth area for receiving reflected light reflected by the recording medium and respectively outputting a first detection signal, a second detection signal, a third detection signal and a fourth detection signal corresponding to the reflected light;
    a phase correction device for outputting a first correction signal by correcting a phase of the first detection signal in accordance with a correction amount and also outputting a second correction signal by correcting a phase of the second detection signal in accordance with the correction amount;
    a tracking error detection device for detecting a positional offset between the light beam converged on the recording medium and the track based on a phase difference between a first addition signal and a second addition signal and outputting a tracking error signal indicating the positional offset, the first addition signal being obtained by adding the first correction signal output from the phase correction device and the fourth detection signal output from the light detection device and the second addition signal being obtained by adding the second correction signal output from the phase correction device and the third detection signal output from the light detection device;
    a tracking control device for performing feedback control of the moving device so that the light beam converged on the recording medium is positioned on the track, based on the tracking error signal; and
    an adjustment device for adjusting the correction amount for the phase correction device based on an asymmetry level based on the tracking error signal without causing the tracking control device to perform feedback control.

2. An optical disk apparatus according to claim 1, wherein the adjustment device drives the moving device to move the converging device in a prescribed direction, measures an asymmetry level based on the tracking error signal with respect to a reference position of the converging device for each of a plurality of correction amount candidates for the phase control device, and determines one of the plurality of correction amount candidates as the correction amount for the phase correction device based on the asymmetry level based on the tracking error signal.

3. An optical disk apparatus according to claim 2, wherein the prescribed direction includes both positive and negative directions with respect to the reference position of the converging device.

4. An optical disk apparatus according to claim 3, wherein the adjustment device determines one of the plurality of correction amount candidates as the correction amount for the phase correction device so as to minimize the difference between an asymmetry level based on the tracking error signal obtained when the converging device is moved in the positive direction and an asymmetry level based on the tracking error signal obtained when the converging device is moved in the negative direction.

5. An optical disk apparatus according to claim 3, wherein the adjustment device determines one of the plurality of correction amount candidates as the correction amount for the phase correction device so as to minimize a sum of absolute values of an asymmetry level based on the tracking error signal obtained when the converging device is moved in the positive direction and an asymmetry level based on the tracking error signal obtained when the converging device is moved in the negative direction.

6. An optical disk apparatus according to claim 1, wherein the adjustment device measures an amplitude of the tracking error signal and determines one of the plurality of correction amount candidates as the correction amount for the phase correction device so that the value of the amplitude has a prescribed value or more.

7. An optical disk apparatus according to claim 1, wherein, when the reproduction rate is changed from a first reproduction rate to a second reproduction rate, the adjustment device adjusts the correction amount for the phase correction device based on an asymmetry level based on the tracking error signal without causing the tracking control device to perform feedback control.

8. An optical disk apparatus, comprising:
    a rotating device for rotating a recording medium at a prescribed reproduction rate;
    a converging device for converging a light beam on the recording medium;
    a moving device for moving the converging device so as to cause the light beam converged on the recording medium to cross a track of the recording medium;
    a light detection device having a first area, a second area, a third area and a fourth area for receiving reflected light reflected by the recording medium and respectively outputting a first detection signal, a second detection signal, a third detection signal and a fourth detection signal corresponding to the reflected light;
    a phase correction device for outputting a first correction signal by correcting a phase of the first detection signal in accordance with a correction amount and also outputting a second correction signal by correcting a phase of the second detection signal in accordance with the correction amount;

a tracking error detection device for detecting a positional offset between the light beam converged on the recording medium and the track based on a phase difference between a first addition signal and a second addition signal and outputting a tracking error signal indicating the positional offset, the first addition signal being obtained by adding the first correction signal output from the phase correction device and the fourth detection signal output from the light detection device and the second addition signal being obtained by adding the second correction signal output from the phase correction device and the third detection signal output from the light detection device;

a tracking control device for performing feedback control of the moving device so that the light beam converged on the recording medium is positioned on the track, based on the tracking error signal; and an adjustment device for adjusting the correction amount for the phase correction device based on an asymmetry level based on the tracking error signal without causing the tracking control device to perform feedback control, wherein, when the reproduction rate is changed from a first reproduction rate to a second reproduction rate, the adjustment device determines a second correction amount for the phase correction device based on a first reproduction amount for the phase correction device for the first reproduction rate.

9. An optical disk apparatus according to claim 8, wherein the adjustment device sets, as the second correction amount for the phase correction device, a value obtained by multiplying the first correction amount adjusted for the first reproduction rate with a value obtained by dividing the first reproduction rate by the second reproduction rate.

10. An optical disk apparatus, comprising:

a converging device for converging a light beam on a recording medium;

a moving device for moving the converging device so that a converging point of the light beam converged by the converging device moves in a direction substantially perpendicular to an information recording face of the recording medium;

a light detection device for receiving reflected light reflected by the recording medium and outputting a detection signal corresponding to the reflected light;

a converging state detection device for detecting a converging state of the light beam radiated toward the information recording face of the recording medium based on the detection signal output from the light detection device, and outputting a converging state detection signal indicating the converging state;

a focusing control device for controlling the moving device so that a focusing position of the converging device is at a target position, based on the converging state detection signal;

a reproduction signal amplitude detection device for detecting a reproduction signal from the signal output from the light detection device and detecting an amplitude of the reproduction signal;

a jitter amount detection device for detecting a signal corresponding to a jitter of the reproduction signal; and a focusing position adjustment device for adjusting the focusing position of the converging device based on the output from the reproduction signal amplitude detection device, and then adjusting the focusing position of the converging device based on the output from the jitter amount detection device.

11. An optical disk apparatus, comprising:

a converging device for converging a light beam on a recording medium;

a moving device for moving the converging device so that a converging point of the light beam converged by the converging device moves in a prescribed direction;

a light detection device for receiving reflected light reflected by the recording medium and outputting a detection signal corresponding to the reflected light;

an error detection device for detecting an error signal indicating a difference of a control amount of the light beam with respect to a target amount based on the detection signal output from the light detection device;

a control device for controlling the moving device so that the error signal has a prescribed value based on the error signal output from the error detection device;

a gain adjustment device for applying an external disturbance to a control loop of the control device and adjusting a loop gain of the control device based on the error signal output from the error detection device in response to the application of the external disturbance of the control loop; and an abnormality detection device for detecting at least one of a vibration of the optical disk apparatus and a scratch on the recording medium, wherein the gain adjustment device stops the application of the external disturbance for adjusting the loop gain of the control device in response to the detection of at least one of the vibration of the optical disk apparatus or the scratch on the recording medium and to fulfillment of a prescribed condition.

12. An optical disk apparatus according to claim 11, wherein:

the prescribed direction is a direction substantially perpendicular to an information recording face of the recording medium, the error detection device includes a converging state detection device for detecting a converging state of a light beam radiated toward the information recording face of the recording medium based on the detection signal from the light detection device and outputting a converging state detection signal indicating the converging state, and the control device includes a focusing control device for controlling the moving device so that a focusing position of the converging device is at a target position, based on the converging state detection signal.

13. An optical disk apparatus according to claim 11, wherein:

the prescribed direction is a direction in which the light beam converged by the converging device crosses a track on an information recording face of the recording medium, the error detection device includes a tracking offset detection device for detecting a positional offset on the information recording face between the track and the light beam, and outputting a tracking error signal indicating the positional offset, and the control device includes a tracking control device for performing feedback control of the moving device so that the light beam is positioned on the track, based on the tracking error signal.

14. An optical disk apparatus according to claim 11, wherein the prescribed condition indicates that a level of the external disturbance becomes a prescribed value or less.

15. An optical disk apparatus according to claim 14, wherein the prescribed value is zero.

16. An optical disk apparatus according to claim 11, wherein, in the case where the application of the external disturbance is stopped based on the output from the abnormality detection device, the gain adjustment device maintains a level of the external disturbance immediately before the application of the external disturbance is stopped.

17. An optical disk apparatus, comprising:
 a converging device for converging a light beam on a recording medium;
 a moving device for moving the converging device so as to cause the light beam converged by the converging device to cross a track of the recording medium;
 a light detection device for receiving reflected light reflected by the recording medium and outputting a detection signal corresponding to the reflected light;
 a converging state detection device for detecting a converging state of the light beam radiated toward an information recording face of the recording medium based on the detection signal output from the light detection device and outputting a converging state detection signal indicating the converging state;
 a focusing control device for controlling the moving device so that a focusing position of the converging device is at a target position, based on the converging state detection signal;
 an adjustment device for adjusting the focusing position of the converging device based on the detection signal output from the light detection device; and
 an abnormality detection device for detecting at least one of a vibration of the optical disk apparatus and a scratch on the recording medium,
 wherein the adjustment device stops the adjustment of the focusing position of the converging device performed by the focusing control device in response to the detection of at least one of the vibration of the optical disk apparatus or the scratch on the recording medium.

18. An optical disk apparatus according to claim 17, wherein the adjustment device detects a reproduction signal from the detection signal output from the light detection device, and adjusts the focusing position of the converging device based on an amplitude of the reproduction signal.

19. An optical disk apparatus according to claim 17, wherein the adjustment device detects a reproduction signal from the detection signal output from the light detection device, and adjusts the focusing position of the converging device based on a jitter signal corresponding to a jitter of the reproduction signal.

20. An optical disk apparatus according to claim 17, wherein the adjustment device detects a reproduction signal from the detection signal output from the light detection device, and adjusts the focusing position of the converging device based on a signal obtained by adding an amplitude of the reproduction signal and a jitter signal corresponding to a jitter of the reproduction signal at a prescribed ratio.

21. An optical disk apparatus, comprising:
 a rotating device for rotating a recording medium at a prescribed reproduction rate;
 a converging device for converging a light beam on the recording medium;
 a moving device for moving the converging device so as to cause the light beam converged by the converging device to cross a track of the recording medium;
 a light detection device for receiving reflected light reflected by the recording medium and outputting a detection signal corresponding to the reflected light;
 a converging state detection device for detecting a converging state of the light beam radiated toward an information recording face of the recording medium based on the detection signal output from the light detection device, and outputting a converging state detection signal indicating the converging state;
 a focusing control device for controlling the moving device so that a focusing position of the converging device is at a target position, based on the converging state detection signal; and
 a gain adjustment device for applying an external disturbance to a control loop of the focusing control device, and adjusting a loop gain of the focusing control device based on the converging state detection signal output from the converging state detection device in response to the application of the external disturbance to the control loop,
 wherein, when the reproduction rate is changed from a first reproduction rate to a second reproduction rate, the gain adjustment device determines a loop gain for the focusing control device for the second reproduction rate based on a loop gain for the focusing control device adjusted for the first reproduction rate.

22. An optical disk apparatus, comprising:
 a rotating device for rotating a recording medium at a prescribed reproduction rate;
 a converging device for converging a light beam on the recording medium;
 a moving device for moving the converging device so as to cause the light beam converged by the converging device to cross a track of the recording medium;
 a light detection device for receiving reflected light reflected by the recording medium and outputting a detection signal corresponding to the reflected light;
 a tracking offset detection device for detecting a positional offset between the light beam converged on the recording medium and the track of the recording medium based on the detection signal from the light detection device, and outputting a tracking error signal indicating the positional offset;
 a tracking control device for performing feedback control of the moving device so that the light beam converged on the recording medium is positioned on the track, based on the tracking error signal; and
 a gain adjustment device for applying an external disturbance to a control loop of the tracking control device, and adjusting a loop gain of the tracking control device based on the tracking error signal output from the tracking offset detection device in response to the application of the external disturbance to the control loop,
 wherein, when the reproduction rate is changed from a first reproduction rate to a second reproduction rate, the gain adjustment device determines a loop gain for the tracking control device for the second reproduction rate based on a loop gain for the tracking control device adjusted for the first reproduction rate.

* * * * *